(12) United States Patent
Smith

(10) Patent No.: US 8,760,089 B2
(45) Date of Patent: Jun. 24, 2014

(54) VARIABLE SPEED DRIVE SYSTEM

(75) Inventor: Robert C. Smith, Ossian, IN (US)

(73) Assignee: Franklin Electric Company, Inc., Fort Wayne, IN (US)

( * ) Notice: Subject to any disclaimer, the term of this patent is extended or adjusted under 35 U.S.C. 154(b) by 753 days.

(21) Appl. No.: 12/951,176

(22) Filed: Nov. 22, 2010

(65) Prior Publication Data

US 2011/0129368 A1 Jun. 2, 2011

Related U.S. Application Data

(60) Provisional application No. 61/265,332, filed on Nov. 30, 2009.

(51) Int. Cl.
*H02P 25/10* (2006.01)
*H02K 27/04* (2006.01)

(52) U.S. Cl.
CPC .................................... *H02K 27/04* (2013.01)
USPC ........... 318/244; 318/791; 318/779; 318/785; 318/781

(58) Field of Classification Search
CPC ..................................................... H02K 27/04
USPC .......................... 318/244, 791, 779, 785, 781
See application file for complete search history.

(56) References Cited

U.S. PATENT DOCUMENTS

| | | |
|---|---|---|
| 3,529,223 A | 9/1970 | Vergez |
| 3,672,830 A | 6/1972 | Kruper |
| 3,916,274 A | 10/1975 | Lewus |
| 3,958,171 A | 5/1976 | Sekino |
| 4,135,235 A | 1/1979 | Baker |
| 4,167,775 A | 9/1979 | Baker et al. |
| 4,249,120 A | 2/1981 | Earle |
| 4,401,933 A | 8/1983 | Davy et al. |
| 4,467,258 A | 8/1984 | Leuthen |
| 4,546,300 A | 10/1985 | Shaikh |
| 4,743,789 A | 5/1988 | Puskas |
| 4,757,432 A | 7/1988 | Hancock |
| 4,806,838 A | 2/1989 | Weber |
| 4,981,420 A | 1/1991 | Jensen et al. |
| 5,239,250 A | 8/1993 | Kalman et al. |
| 5,423,192 A | 6/1995 | Young et al. |
| 5,451,853 A | 9/1995 | Itoh |
| 5,580,221 A | 12/1996 | Triezenberg |

(Continued)

FOREIGN PATENT DOCUMENTS

| | | |
|---|---|---|
| CN | 1937399 | 3/2007 |
| EP | 0 034 075 | 8/1981 |

(Continued)

OTHER PUBLICATIONS

Powerex; "PS21962-4, PS21962-4A, PS21962-4C—Intellimod Module—Dual-In-Line Intelligent Power Module 5 Anperes/600 Volts"; Powerex, Inc., Youngwood, PA; Revised Mar. 2007.

(Continued)

*Primary Examiner* — David Luo
(74) *Attorney, Agent, or Firm* — Faegre Baker Daniels LLP

(57) ABSTRACT

This disclosure relates to a control system for driving a motor. The motor may include a cut-out circuit. The control system may include a buck-boost circuit to limit the rate of change of an output voltage before the output voltage is applied to operate the motor.

65 Claims, 10 Drawing Sheets

(56) References Cited

U.S. PATENT DOCUMENTS

| | | | |
|---|---|---|---|
| 5,589,753 | A | 12/1996 | Kadah et al. |
| 5,613,844 | A | 3/1997 | Tuckey et al. |
| 5,633,790 | A | 5/1997 | Gritter et al. |
| 5,672,950 | A | 9/1997 | Kemp et al. |
| 5,675,231 | A | 10/1997 | Becerra et al. |
| 5,811,955 | A | 9/1998 | Kachuk |
| 5,828,200 | A | 10/1998 | Ligman et al. |
| 5,859,519 | A | 1/1999 | Archer |
| 5,883,488 | A | 3/1999 | Woodward |
| 6,022,196 | A | 2/2000 | Jensen et al. |
| 6,121,749 | A | 9/2000 | Wills et al. |
| 6,141,217 | A | 10/2000 | Nakahama et al. |
| 6,167,965 | B1 | 1/2001 | Bearden et al. |
| 6,249,104 | B1 | 6/2001 | Janicek |
| 6,254,353 | B1 * | 7/2001 | Polo et al. ............... 417/44.11 |
| 6,264,431 | B1 | 7/2001 | Triezenberg |
| 6,320,348 | B1 | 11/2001 | Kadah |
| 6,329,783 | B1 | 12/2001 | Vrionis et al. |
| 6,469,469 | B1 | 10/2002 | Chambers et al. |
| 6,515,386 | B2 | 2/2003 | Jacobsen |
| 6,653,806 | B1 | 11/2003 | Ono |
| 6,977,478 | B2 | 12/2005 | Biamonte et al. |
| 7,061,195 | B2 * | 6/2006 | Ho et al. ................... 318/438 |
| 7,061,204 | B2 | 6/2006 | Unno |
| 7,064,463 | B2 | 6/2006 | Matin et al. |
| 7,071,650 | B2 | 7/2006 | Ilda |
| 7,135,829 | B1 * | 11/2006 | Sorkin ................ 318/400.07 |
| 7,188,669 | B2 | 3/2007 | Bullock et al. |
| 7,202,619 | B1 * | 4/2007 | Fisher ................. 318/400.29 |
| 7,215,051 | B2 | 5/2007 | Neri |
| 7,307,400 | B2 | 12/2007 | Rastogi et al. |
| 7,391,179 | B2 | 6/2008 | Zhao |
| 7,471,058 | B2 | 12/2008 | Duarte et al. |
| 7,508,147 | B2 | 3/2009 | Rastogi et al. |
| 7,531,976 | B2 * | 5/2009 | Fukamizu et al. ....... 318/400.34 |
| 2004/0088797 | A1 | 5/2004 | Darby |
| 2006/0078444 | A1 | 4/2006 | Sacher |
| 2006/0266064 | A1 | 11/2006 | Rowatt |
| 2008/0094021 | A1 | 4/2008 | Garza |
| 2008/0191659 | A1 | 8/2008 | Borsting et al. |
| 2009/0174359 | A1 | 7/2009 | Gonthier et al. |

FOREIGN PATENT DOCUMENTS

| | | |
|---|---|---|
| JP | 05049298 | 2/1993 |
| JP | 09137794 | 5/1997 |
| JP | 2005330970 | 12/2005 |

OTHER PUBLICATIONS

Powerex; "Gen. 4 Large DIP-IPM Used as Low Cost H-Bridge"; Revised Apr. 24, 2009.

* cited by examiner

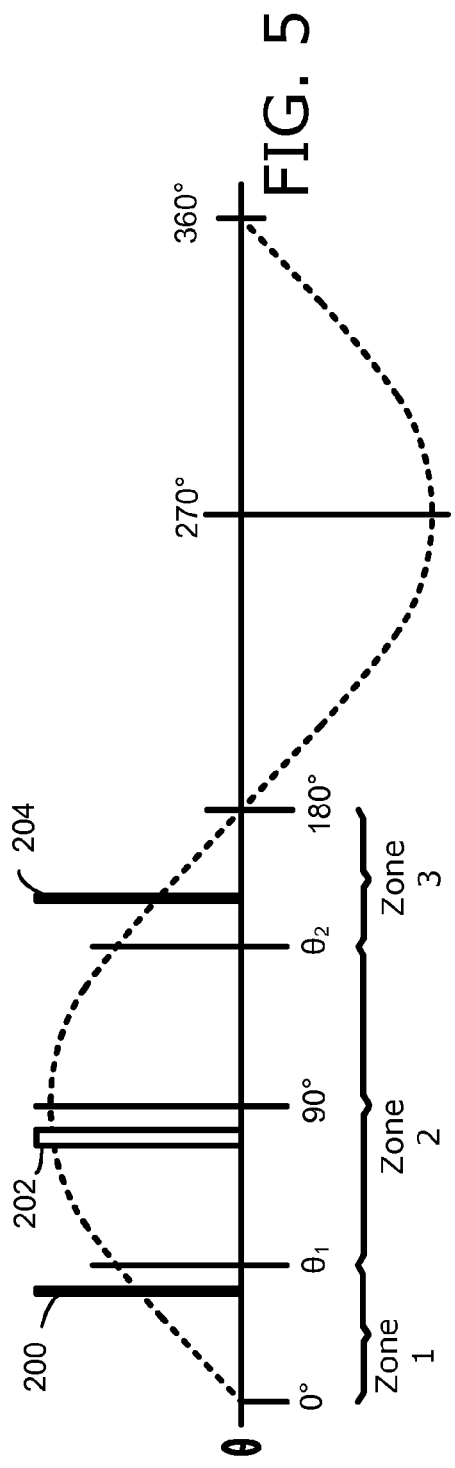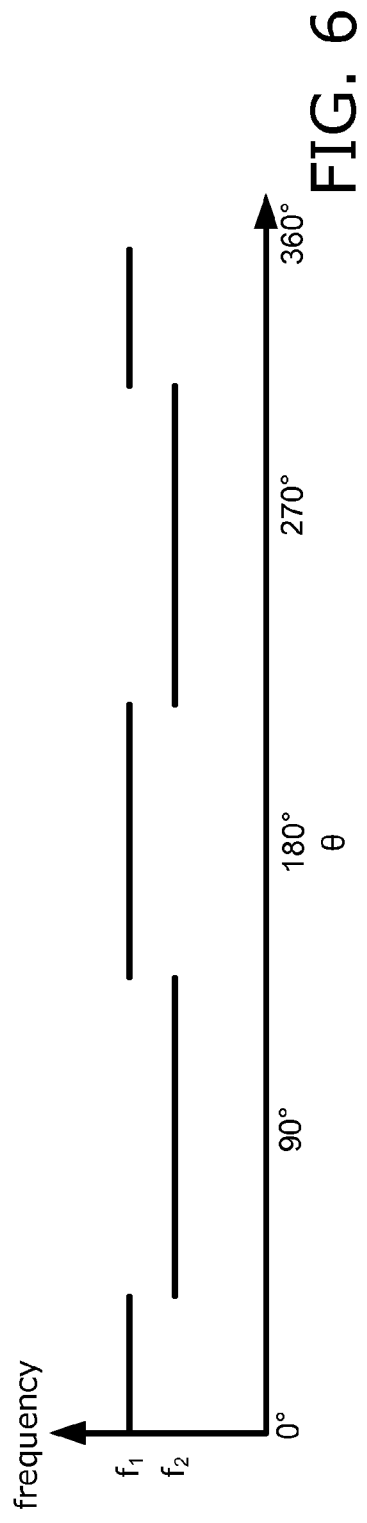

VARIABLE SPEED DRIVE SYSTEM

CROSS-REFERENCE TO RELATED APPLICATIONS

This application claims the benefit of U.S. Patent Application Ser. No. 61/265,332 entitled VARIABLE SPEED DRIVE SYSTEM filed on Nov. 30, 2010, which is expressly incorporated by reference herein in its entirety.

FIELD OF THE DISCLOSURE

A system and method for driving a motor are disclosed, and more particularly a system and method for controlling an operating characteristic of the motor or the system.

BACKGROUND OF THE DISCLOSURE

Fluid supply systems use motors to drive pumps and transfer fluids from supply reservoirs, such as wells, to demand reservoirs, such as tanks. A sensor measures a characteristic of the fluid, and a controller controls operation of the motor. In some systems, the controller measures a level of the fluid in a tank and controls operation of the motor to maintain the level within a range. When the level reaches the low end of the range, the controller turns the motor on and keeps it on until the level reaches the high end of the range.

In other systems, the speed of the motor is controlled to maintain a fluid characteristic within predetermined parameters. Variable speed controls can gradually increase or decrease the pumping rate and thereby reduce the variability of the fluid characteristic. However, many systems currently in operation were not designed to operate at a variable speed and may not be capable of doing so.

SUMMARY OF THE DISCLOSURE

In an exemplary embodiment of the present disclosure, a method and system for driving a motor at a variable speed with a control system are provided herein. In some embodiments, the system is operable to control a fluid characteristic with a pump driven by the motor.

In another exemplary embodiment of the present disclosure a fluid displacement system is provided, the fluid displacement system comprising: a pump for displacing a fluid; a motor drivingly connected to the pump; a plurality of power switches; and a controller generating a first plurality of switching signals and a second plurality of switching signals to switch the plurality of power switches, the first plurality of switching signals provided to the plurality of power switches when a commutation angle of the motor is at or proximal to a first angle, the second plurality of switching signals provided to the plurality of power switches when the commutation angle is at or proximal to a second angle, the first plurality of switching signals having a first maximum switching frequency which is higher than a second maximum switching frequency of the second plurality of switching signals.

In yet another exemplary embodiment of the present disclosure a fluid displacement system is provided, the fluid displacement system comprising: a pump for displacing a fluid; a motor drivingly connected to the pump; a plurality of power switches having a plurality of power switches to drive the motor, the power switches producing a voltage rate of change exceeding a predetermined voltage rate of change of the motor; and a buck-boost circuit coupled between the plurality of power switches and the motor to limit the voltage rate of change produced by the power switches below the predetermined voltage rate of change.

In a further exemplary embodiment of the present disclosure a control system for driving a motor is provided, the control system comprising: a plurality of power switches having a plurality of power switches producing a voltage rate of change exceeding a predetermined voltage rate of change of the motor; and a buck-boost circuit coupled between the plurality of power switches and the motor to limit the voltage rate of change produced by the power switches below the predetermined voltage rate of change.

In still another exemplary embodiment of the present disclosure, a control system for driving a motor is provided, the control system comprising: a plurality of power switches having a plurality of power switches producing a motor voltage having a voltage rate of change; and a controller generating a first plurality of switching signals and a second plurality of switching signals to drive the motor, the first plurality of switching signals generated when a commutation angle of the motor is at or proximal to a first angle, the second plurality of switching signals generated when the commutation angle is at or proximal to a second angle, the first plurality of switching signals having a first maximum switching frequency which is higher than a second maximum switching frequency of the second plurality of switching signals.

In yet another exemplary embodiment of the present disclosure, a control system for driving a motor is provided, the control system comprising: voltage generation means for providing a voltage having a voltage rate of change; and circuit means coupled between the voltage generation means and the motor for reducing the voltage rate of change produced by the voltage generation means.

In a still further exemplary embodiment of the present disclosure, a control system for driving a motor is provided, the control system comprising: voltage generation means for providing a voltage having a voltage rate of change; and control means for generating a first plurality of switching signals and a second plurality of switching signals, the first plurality of switching signals provided when a commutation angle of the motor is at or proximal to a first angle, the second plurality of switching signals provided when the commutation angle is at or proximal to a second angle, the first plurality of switching signals having a first maximum switching frequency which is higher than a second maximum switching frequency of the second plurality of switching signals.

In a yet further exemplary embodiment of the present disclosure, a method of driving a motor is provided, the method comprising: switching a plurality of power switches to generate an output voltage having a rate of change exceeding a predetermined rate of change; and reducing the rate of change of the output voltage to produce motor voltage with a motor voltage rate of change below the predetermined rate of change.

In still another exemplary embodiment of the present disclosure, a method of driving a motor is provided, the method comprising: generating a first plurality of switching signals and a second plurality of switching signals, the first plurality of switching signals generated when a commutation angle of the motor is at or proximal to a first angle, the second plurality of switching signals generated when the commutation angle is at or proximal to a second angle, the first plurality of switching signals having a first maximum switching frequency which is higher than a second maximum switching frequency of the second plurality of switching signals; and switching a plurality of power switches with the first plurality of switching signals and the second plurality of switching signals to generate an output voltage.

In a still further exemplary embodiment of the present disclosure, a method of driving a motor is provided, the method comprising the steps of: powering the motor according a first fundamental voltage/frequency relationship; detecting a current decrease of a fundamental current drawn by the motor; and after detecting the current decrease, powering the motor according to a second fundamental voltage/frequency relationship.

In a yet still further exemplary embodiment of the present disclosure, a control system for driving a motor is provided, the control system comprising: a plurality of power switches producing a fundamental voltage; and a controller operably coupled to the plurality of power switches, the controller generating a first plurality of switching signals according to a first fundamental voltage/frequency relationship, detecting a current decrease of a fundamental current drawn by the motor, and after detecting the current decrease, generating a second plurality of switching signals according to a second fundamental voltage/frequency relationship.

The foregoing aspects and other aspects disclosed below, and many of the attendant advantages of this invention will become more readily appreciated as the same become better understood by reference to the following detailed description when taken in conjunction with the accompanying drawings.

BRIEF DESCRIPTION OF THE DRAWINGS

FIG. 5 is a conceptual graph of an magnetic flux sine-wave and representative PWM pulses generated with a variable frequency drive;

FIG. 6 is a conceptual graph showing a frequency function based on a commutation angle of a motor;

Figure 1:
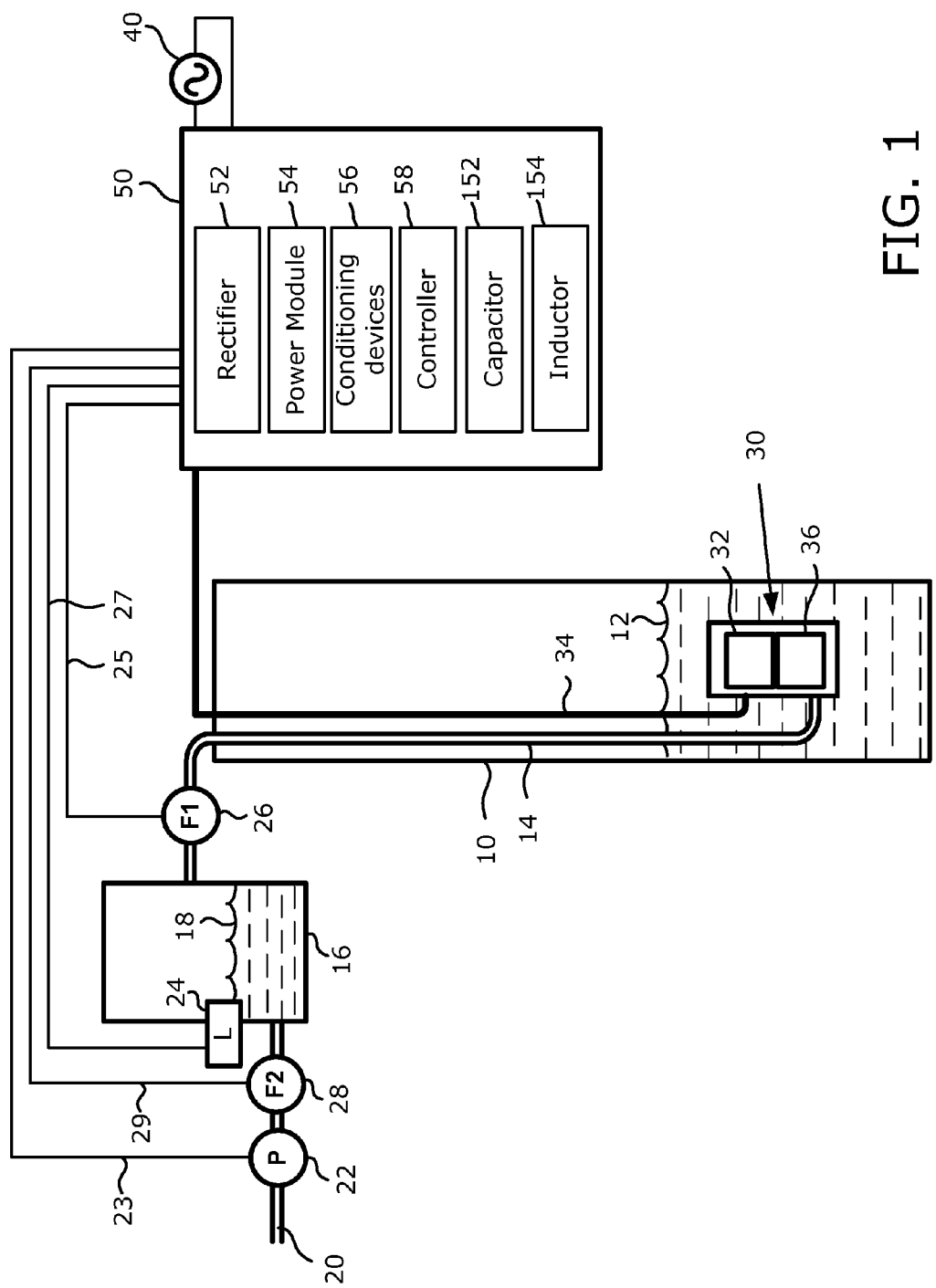
FIG. 1 is a block diagram of an exemplary liquid supply system.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. As used herein, the terms "comprising" and "including" denote an open transition meaning that the claim in which the open transition is used is not limited to the elements following the transitional term.

FIG. 1 illustrates an exemplary embodiment of a liquid supply system comprising a reservoir 10 containing a liquid 12 which is pumped by a pump unit 30 through a conduit 14 into a reservoir 16. Pump unit 30 includes a pump 36 driven by a motor 32 which is powered by a system controller 50 through a connector 34. In one variation thereof, reservoir 10 is a deep-well and connector 34 exceeds 500 feet in length. In another variation thereof, motor 32 comprises a conventional induction motor and pump 36 comprises a conventional centrifugal pump. In yet another variation thereof, a conventional one-way check valve (not shown) is provided between pump 36 and reservoir 16 to prevent backflow of liquid 12. In one example, connector 34 comprises two wires and provides single-phase power to motor 32. An exemplary electrical diagram of a two-wire motor 32 is shown FIG. 2 and is discussed in detail further below. In other example, connector 34 may comprise four wires to provide three-phase power and a ground connection to a motor.

During operation, a liquid 18 flows out of a conduit 20. It should be understood that numerals 12 and 18 refer to portions of a common liquid rather than to different liquids and are provided to elucidate both ends of the supply process. Fluid characteristics including liquid level, flow rate differential, and pressure may be monitored by a level sensor 24, flow sensors 26, 28 and/or a pressure sensor 22 disposed in reservoir 16, conduit 14, and conduit 20, respectively. Corresponding measurement signals are provided through lines 23, 25, 27 and 29 to system controller 50. While any number of fluid characteristics may be measured to provide feedback to system controller 50, it should be understood that the exemplary system described herein may function with a single sensor or with multiple sensors. Advantageously, multiple sensors may be used to provide redundancy and detect system malfunctions such as leaks, obstructions and malfunctioning sensors, valves and other devices typically used with liquid supply systems. Alternatively, other fluid sensors may be positioned in reservoir 16 or in any other location where a characteristic of the supply liquid useful to calculate a desired pumping rate may be measured. In one example, reservoir 10 is an above ground tank. In another example, reservoir 10 is an underground tank. In a further example, reservoir 10 is a well casing or any other reservoir containing liquid 12. In a further example, reservoir 16 is an above ground tank. In another example, reservoir 16 is an underground tank. In a further example, reservoir 16 is any other reservoir containing liquid 18.

Connector 34 provides electrical power to motor 32 from system controller 50. In one exemplary embodiment, system controller 50 comprises electronic components for determining a value of the fluid characteristic, comparing the value to target parameters, and providing variable power to motor 32 to control the fluid so that an actual value of the fluid characteristic matches the target. Put differently, system controller 50 reduces a variance between the actual and target values of the fluid characteristic by controlling the speed of motor 32. The comparing and providing steps may be carried out by a processing system capable of executing processing instructions, by a logic circuit, or by a hybrid system that processes instructions and also comprises logic circuits.

The processing system may receive inputs from the fluid sensors directly or may receive signals scaled and conditioned by electronic circuits for sensing and measuring fluid characteristics. Exemplary sensors include flow meters, velocity sensors, ultrasonic sensors, particulate sensors, and pressure sensors. The processing system may also receive user inputs corresponding to the desired fluid parameters and user inputs for programming various operating schedules. For example, the user may elect to maintain fluid pressure in the system during day time and not night time, or may select different fluid pressures at different times of the day based on planned consumption. System controller 50 may include hardware and software interfaces required to input the parameters including touch-screen displays, keyboards, mouse, speech-recognition systems and any other input and output interface. In a variation thereof, a system controller comprises a drive portion and a fluid control portion. The fluid control portion interfaces with fluid sensors such as sensors 22-28 and provides a reference signal to the drive portion. The drive portion controls operation of motor 32 to track the reference signal. In one example, the fluid control portion is provided in a remotely located housing relative to the location of the drive portion. The reference signal may comprise a signal selected from the group including analog, digital, and wireless. The drive portion comprises a buck-boost circuit described further below with reference to FIGS. 3 and 4.

In the exemplary system controller shown in FIG. 1, system controller 50 comprises a rectifier 52, a power module 54, conditioning devices 56, a controller 58, a capacitor 152 and an inductor 154. An AC power supply 40 provides standard 50-60 cycle AC power. Rectifier 52 converts AC power into DC power and power module 54 converts the DC power into single-phase variable frequency power based upon switching signals provided by controller 58. In one example, variable frequency power comprises pulse-width-modulation (PWM) power. In one variation of the present embodiment, controller 58 comprises a processing system comprising inputs, outputs, a program embedded in a memory, a processor applying program instructions to input values to produce output values, and various input and output interfaces to isolate and condition input and output signals. Exemplary outputs include 4-20 mA outputs, 0-10 vdc outputs, optically isolated contacts, digital outputs, and any other suitable outputs. Exemplary inputs include AC and DC inputs, 4-20 mA current inputs, 0-10 vdc inputs, digital inputs, and any other suitable inputs. Exemplary processing systems include microcontrollers, PLCs, computers, portable computers, laptop computers, logic circuits, FPGAs, and any devices known in the art capable of receiving user inputs and performing an operation on the user inputs to generate outputs for switching power modules. The operation of capacitor 152 and inductor 154 will be described with reference to FIGS. 3 and 3A.

Figure 2:
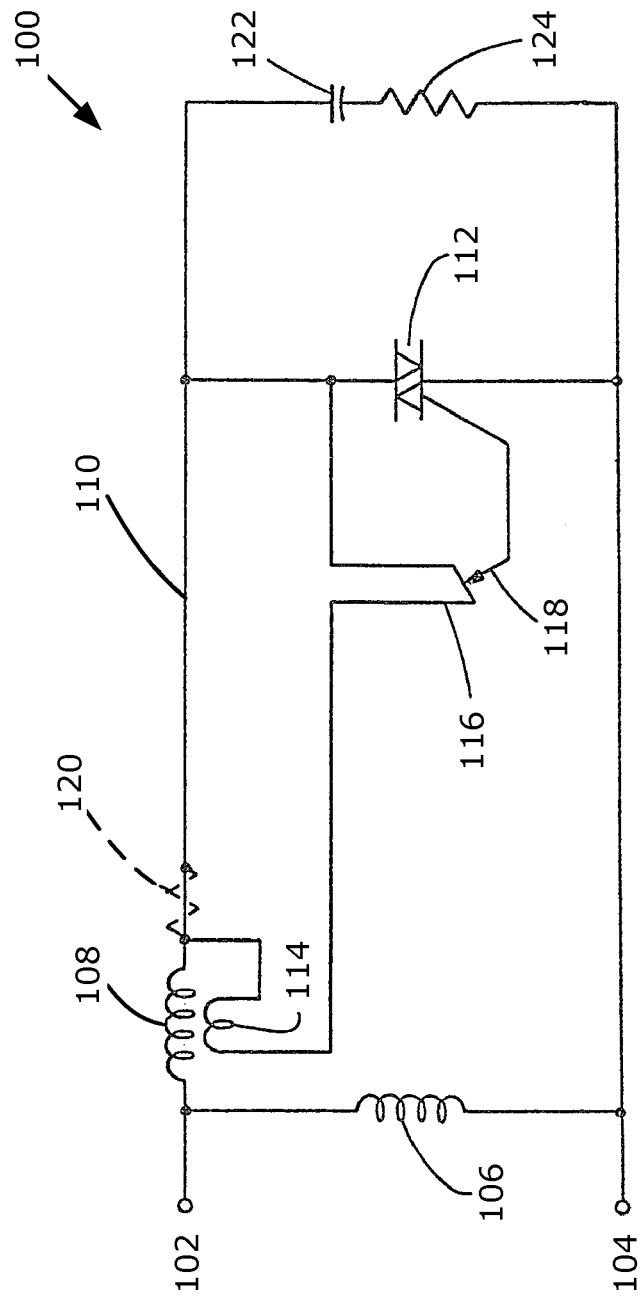
FIG. 2 is a diagram of a motor.

FIG. 2 illustrates a diagram 100 of an exemplary induction motor including a cut-out circuit. Additional details regarding the cut-out circuit and other cut-out circuits are described in U.S. Pat. No. 4,325,012 to Schaefer which is incorporated herein by reference in its entirety. The diagram comprises conductors 102, 104 for receiving power from a drive portion or controller and providing power to primary and secondary windings 106, 108. The cut-out circuit comprises a power switch 112, a bimetal member 116 and a contact 118. Optionally, a snubber resistor 124 and a capacitor 122 may be connected across power switch 112, and a resistor 120 may be placed in series with secondary, or start, winding 108. The power or main terminals of power switch 112 are connected in series with start winding 108, and the gate of power switch 112 is connected to contact 118. An exemplary power switch is the TMG16C60 bidirectional triode thyristor (TRIAC) manufactured by SanRex Corporation located at 50 Seaview Blvd, Port Washington, N.Y. The TMG16C60 TRIAC and equivalent TRIACs have a 5 v/µsec dv/dt critical rate of rise of commutation voltage. Generally, any electronic circuit having a gate for controlling on and off states of the circuit is suitable for use in the cut-out circuit so long as the circuit is rated to conduct the current passing through secondary winding 108. Another exemplary gated circuit comprises two unilateral thyristors, or silicon-controlled rectifiers (SCRs), in inverse parallel connection. The legs of bimetal member 116 are connected across a sensor 114, for example a sensing coil. One leg is connected to one side of sensor 114 and the other leg to the other side of start winding 108 at line 110 which runs from start winding 108 to power switch 112. Thus, current flow induced in sensor 114 flows through the gate of power switch 112 by way of bimetal member 116 and contact 118 until bimetal member 116 reaches a predetermined temperature at which time it opens contact 118 to shut down power switch 112. In one example, sensor 114 is a coil wound concentrically with start winding 108. When the motor starts up, current flow proportional to the motor speed passes through sensor 114. When the motor speed reaches a predetermined speed corresponding to the cut-out temperature of bimetal member 116, bimetal member 116 opens the gate circuit and cuts-out the secondary winding. In another example, a single phase induction motor includes a starting capacitor which provides the motor with start-up energy. The start-up capacitor is considered to be a component of the motor since the motor would not operate properly without it, even though the capacitor is not necessarily mounted within the motor cavity where the windings are located.

Figure 3:
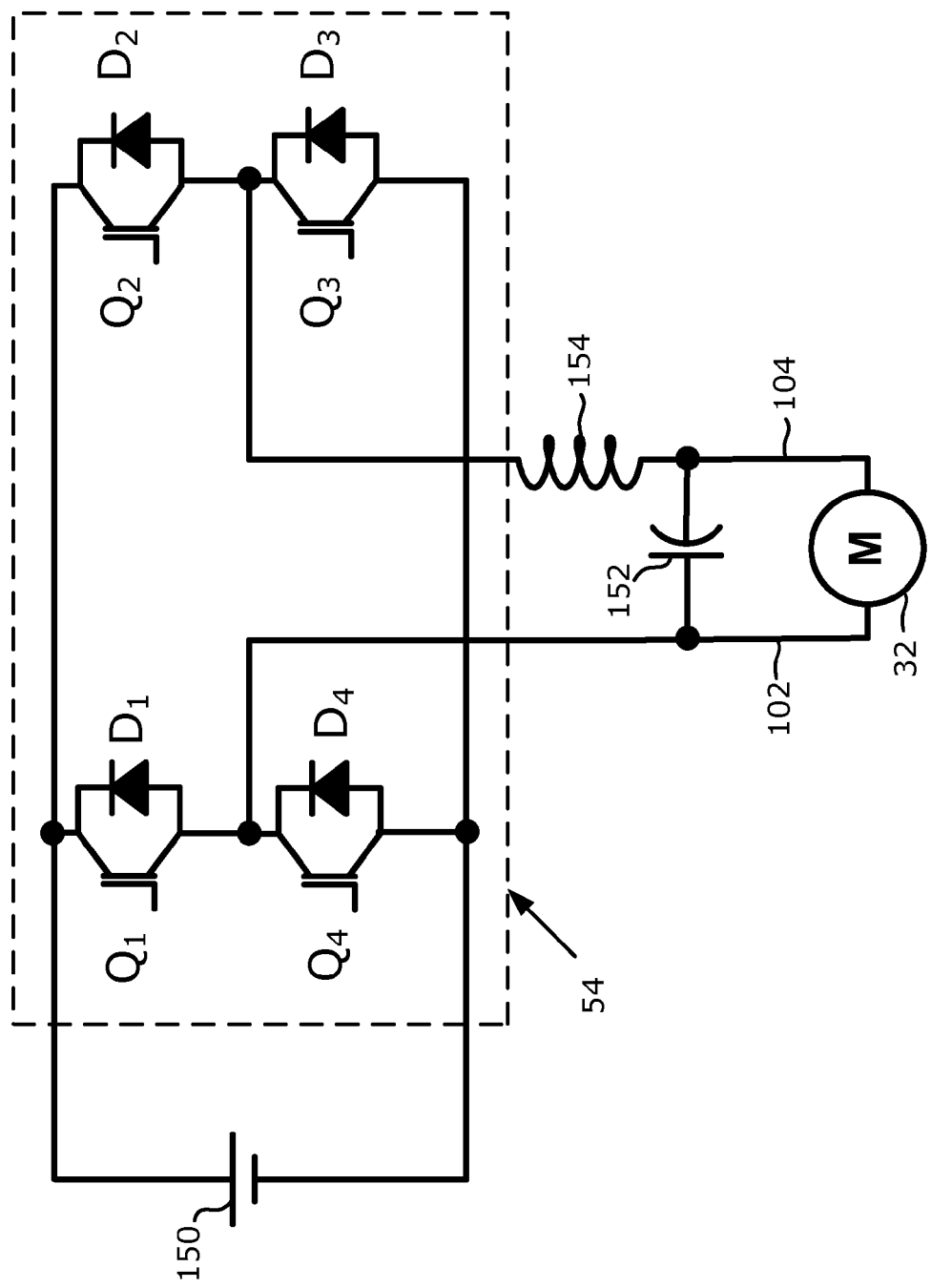
FIGS. 3 and 3A are conceptual schematic diagrams of exemplary embodiments of power circuits.

FIG. 3 is a conceptual schematic diagram of an exemplary embodiment of a power circuit including power module 54 coupled to capacitor 152 and inductor 154 which form a dipolar buck-boost circuit. Advantageously, the buck-boost circuit slows the rate of change of PWM signals to prevent false-triggering of the motor's power switch. The values of capacitor 152 and inductor 154 are selected to obtain a dv/dt rate which is below the maximum voltage rate of change of the power switch in the motor, which may be predetermined empirically or also by reviewing the technical specifications of the power switch. More generally, a desired voltage rate of change may be achieved by predetermining the voltage rate of change of the voltage to be fed to the motor, as illustrated hereinabove with reference to the motor's power switch, and then sizing the buck-boost circuit to slow or reduce the voltage rate of change of the voltage output by the power module. There is an inter-play between the buck-boost components sizes and the v/f parameters. In a conventional control circuit, without modification to the switching function (exemplary modifications to the switching function are described below), the size of the capacitor is proportional to the switching frequency and both are selectable within reasonable design boundaries defined by the chosen motor and other components of the system. The desired motor voltage rate of change can thus be predetermined based on the selection of the system components, the v/f curve, empirically obtained failure data, and other suitable criteria. Then, the buck-boost components can be chosen. As explained below, the power module switching function can be designed to selectively reduce the switching frequencies. Consequently, in addition to the v/f operating points, a designer may select a suitable switching function and thus also predetermine the energy to be absorbed by the buck-boost components, and their sizes. In one example thereof, the values of capacitor 152 and inductor 154 range between 2-8 uF and 2-10 mH. In another example thereof, the values of capacitor 152 and inductor 154 range between 4-6 uF and 3-6 mH. In a further example thereof, power module 54 includes an H-bridge comprising four power switches numbered Q1-Q4, exemplified as IGBTs, and four diodes D1-D4. Other exemplary power switches include MOSFET, SCR, TRIAC, gate turn-off transistor (GTO) and other known gated switches. Motor 32 is coupled in parallel with capacitor 152. Q1 and Q2 comprise the high side of the H-bridge and Q3 and Q4 comprise the low side of the H-bridge. Rectifier 52 provides a source of DC power, denoted by reference numeral 150, to the H-bridge. In one variation of the present embodiment, conditioning devices 56, including noise filtering capacitors, are provided. In another variation thereof, current sensors (not shown) are provided and the current signals are used by the controller to limit the current passing through Q1-Q4 and thereby to protect power module 54 from over-current conditions. In operation, controller 58 outputs PWM switching signals to the gates of power switches Q1-Q4 and power switches Q1-Q4 generate PWM power signals for the motor. PWM power signals are determined based on the motor windings, DC power source 150 and the capacity of the power switches. The voltage level may exceed, in some embodiments, 200 volts. In one example, the switching frequencies range between 1 and 60 kilohertz. In another example the switching frequencies range between 5 and 50 kilohertz. In a further embodiment, the switching frequencies range between 10 and 40 kilohertz. To reduce switching losses (heat) caused by switching frequencies, PWM signals may be modified as disclosed hereinbelow with reference to FIGS. 5 to 10.

Figure 3A:
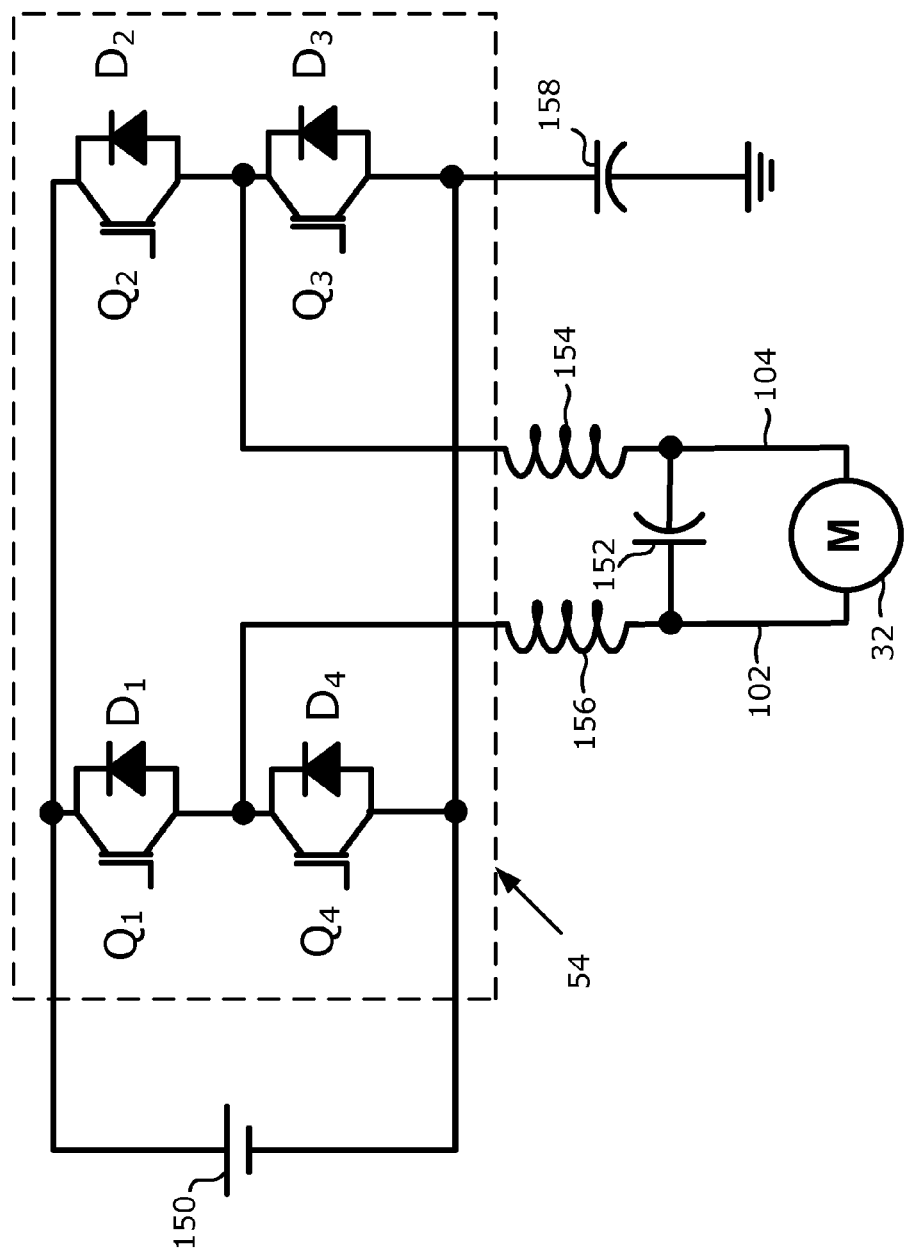

FIG. 3A illustrates another exemplary embodiment of a power circuit which is similar to the embodiment shown in FIG. 3 except for the addition of an inductor 156 and a capacitor 158. Advantageously, the addition of inductor 156 balances the power circuit and the addition of capacitor 158 reduces the negative effect of cable-length induced currents. Inductors 154 and 156 may be wound on the same magnetic structure. Capacitor 158 is connected to ground to center the voltage around 0 volts for either motor terminal with respect to earth ground thereby avoiding any galvanic interaction of the motor conductors to earth ground in the event of unintentional exposure of the conductors to earth ground, e.g., in the event the insulation of a conductor is damaged. In a further exemplary embodiment, discussed below with reference to FIG. 11, motor voltage and current are measured over time to compare operation of the motor at different points in time. In one example, measurements comparisons are used to distinguish normal load operation from overload operation. In another example, measurements comparisons are used to detect non-linear measurement values which may be caused by load abnormalities, wear and other causes. In one variation of the present embodiment, the switching signals are adjusted to compensate for overload conditions and abnormalities. In one example, the switching signals are PWM signals whose widths are adjusted, and may even be adjusted at a pulse-by-pulse level. In another example, the switching signals are frequency modulated to compensate for the overload conditions and/or abnormalities. In a further example, pulse corrections are implemented to control noise in the system. In another variation, current and/or voltage are measured to detect the current and/or voltage at which the cut-out circuit disconnects the starting coil, which may be referred to as the cut-out threshold. Measurements are taken over time to detect shifts in the cut-out voltage and/or current. In response to such shifts, the system modifies the voltage/frequency curve to compensate for the cut-out shift. In one example, the modification comprises increasing the ratio of the frequency to the voltage.

Figure 4:
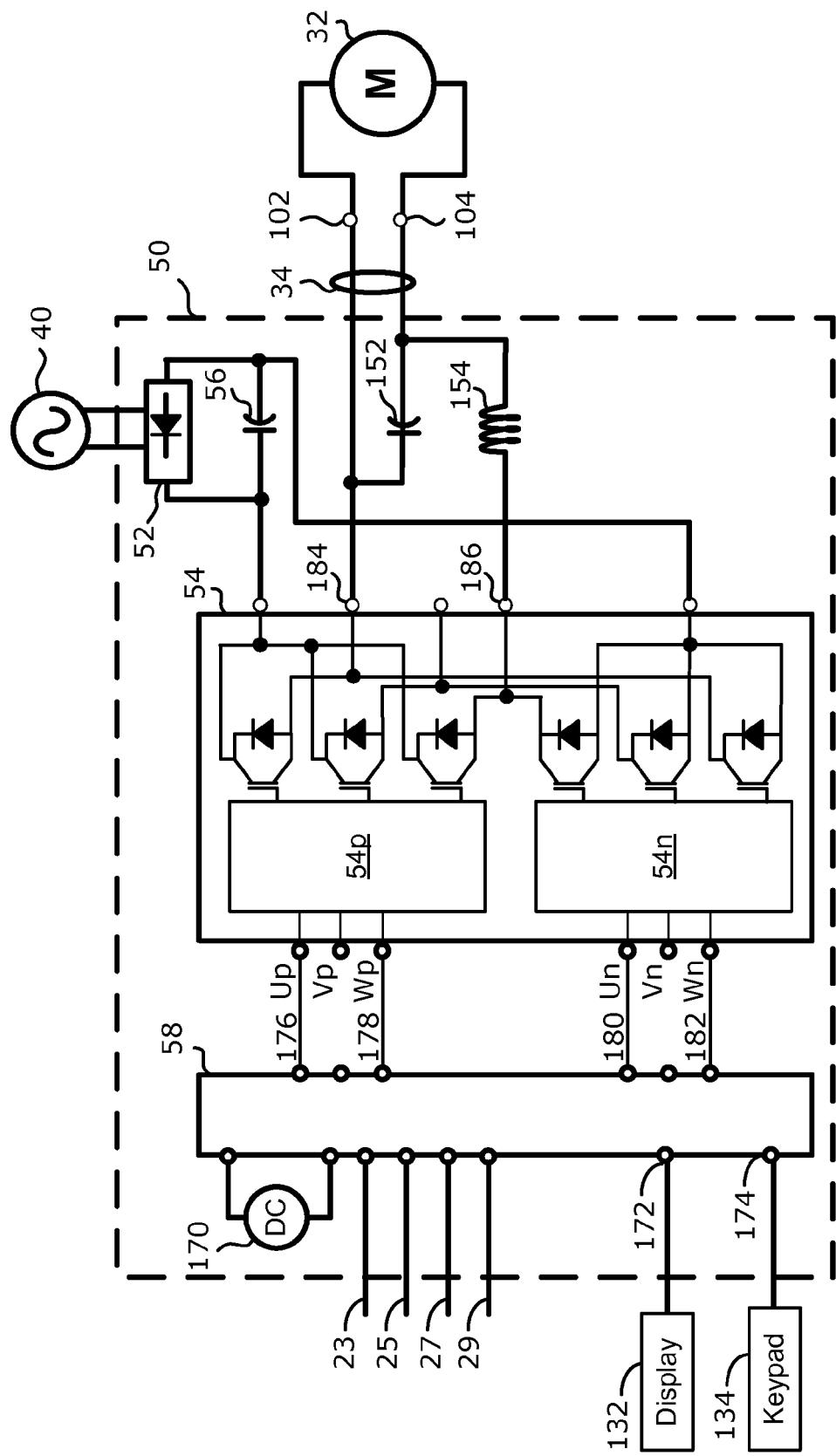
FIG. 4 is a diagram of an exemplary embodiment of a system controller.

FIG. 4 is a diagram of an exemplary embodiment of system controller 50 comprising the power circuit illustrated in FIG. 3. Rectifier 52 provides DC power to power module 54. Conditioning device 56, exemplified as a capacitor, is coupled across rectifier 52 to suppress voltage surges. Additional conditioning devices may be provided, for example, to filter the DC power. Rectifier 52 may be any known rectifier including known bridge rectifiers. Power module 54 is shown as having six power switches driven by switching signals provided to contacts Up, Wp, Un and Wn. Contacts Vp and Vn are not used in this exemplary embodiment, therefore the six switch power module is used as an H-bridge to drive a single phase motor. Circuits 54p and 54n provide signal conditioning, undervoltage protection, overcurrent protection, temperature sensing, and fault logic. Exemplary power modules are distributed by Powerex, Inc., 173 Pavilion Lane, Youngwood, Pa. under the trademark INTELLIMOD™. An exemplary circuit for connecting an INTELLIMOD™ PS21962-4 power module to a controller is described in the INTELLIMOD™ PS21962-4 datasheet which is incorporated by reference herein in its entirety. The buck-boost circuit comprising capacitor 152 and inductor 154 is coupled to power contacts in power module 54 and to connector 34. Motor 32 is coupled to the opposite end of connector 34. Controller 58 comprises a processor, inputs, outputs, embedded memory and a program stored in the memory. Input contacts receive fluid characteristic signals on one or more of lines 23, 25, 27 and 29. DC power source 170 powers controller 58. Contacts 172, 174 are provided for connection to input and output interface devices for setting operating parameters. Exemplary interface devices include displays, keyboard, mouse, keypad, internet connections to remote interface devices, and other suitable devices for providing signals or data. A display 132 and a keypad 134 are shown. Lines 176, 178, 180 and 182 couple controller 58 output contacts to power module 54 input contacts to operably couple controller 58 outputs to the gates of the power switches. The program causes the output contacts to switch between high and low states to turn the power switches on and off thereby generating PWM power signals at contacts 184 and 186.

According to embodiments of the disclosure discussed below, the drive portion or system controller generates switching signals as a function of the commutation angle θ. Traditional PWM power signals comprise a multitude of pulses adapted to approximate a magnetic flux in the motor having a sine wave shape of approximately a 60 hertz cycle. The width of pulses and the spacing between pulses may be changed based on various design criteria typically related to the power module, motor, or other system characteristics. The approximation improves as the switching frequency increases. However, in the system described with reference to FIG. 1, as the switching frequency increases, losses in the buck-boost circuit also increase. Losses are at a maximum at θ=90 and 270 degrees and at a minimum at θ=0 and 180 degrees. Advantageously, in an exemplary embodiment of a motor control method, the switching frequency is reduced proximally to θ=90 and 270 degrees to reduce switching losses without significant degradation in performance. FIG. 5 is a graph illustrating the commutation angle θ of a fundamental sine wave. According to the loss reduction principle described above, pulses 200, 202 and 204 are generated at frequencies which are a function of the commutation angle θ.

A number of switching functions are described in FIGS. 6 to 10. In one exemplary embodiment of the disclosure, the switching functions generate pulses 200 and 204 at a first switching frequency and pulses 202 at a second switching frequency that is lower than the first frequency. Because pulse 202 is proximal to 90 degrees and pulses 200 and 204 are proximal to 0 and 180 degrees, switching at the first and second frequencies reduces switching losses. In one example illustrated in FIG. 6, a step-function is shown designed to generate pulses 200 and 204 at a high frequency relative to the frequency at which pulse 202 is generated. Advantageously, step pulses may be generated by controller 58 and also by logic circuits. The graph in FIG. 6 illustrates frequencies $f_1$ and $f_2$, with $f_1$ being higher relative to $f_2$. The periodicity of the low and high frequencies correspond to zones 1, 2 and 3 shown in FIG. 5 which represent commutation ranges between 0 degrees and $\theta_1$, $\theta_1$ and $\theta_2$, and $\theta_2$ and 180 degrees. The zones then repeat between 180 and 360 degrees. Selection of $\theta_1$ and $\theta_2$ is determined by system requirements. In a variation thereof, $\theta_1$ and $\theta_2$ are set to about 45 and 135 degrees, respectively. In another variation thereof, $\theta_1$ and $\theta_2$ are set to about 60 and 120 degrees.

In another exemplary embodiment of the disclosure, the first and second frequencies are chosen by selection of a commutation angle and an offset from the commutation angle. In one variation, the commutation angle defines the beginning of the slow frequency range and the offset defines its duration. In one example, the commutation angle is 45 degrees and the offset is 90 degrees. The second switching frequency is applied when the second angle is between 45 and 45+90 degrees. In another example, the commutation angle is 90 degrees and the offset is 10 degrees. In a further example, the offset is applied to both sides of the selected commutation angle. While the examples given herein refer to a 90 degree angle, the same principles are applicable at 270 degrees, and together at 90 and 270 degrees.

Figure 7:
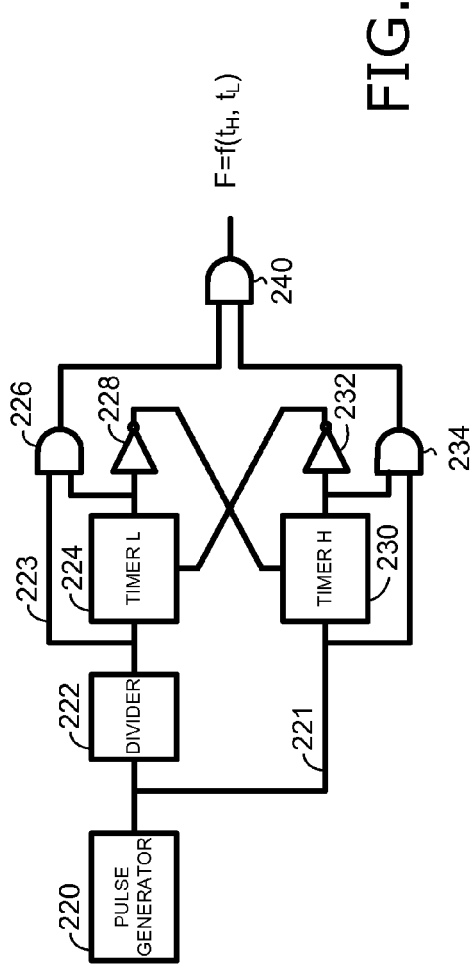
FIG. 7 is a diagram of a logic circuit for generating the frequency function depicted in FIG. 6.

An exemplary embodiment of a logic circuit is shown in FIG. 7 wherein pulses of frequency $f_1$ are output by pulse generator 220 on line 221 and pulses of frequency $f_2$ are output by frequency divider 222 on line 223. The pulses are simultaneously provided to AND gates 226, 234 and timers 224, 230. Timers 224, 230 output enabling signals to AND gates 226, 234 such that when the timers are active, enabling the AND gates, the corresponding frequency signals pass through to AND gate 240. At the same time, the enabling signals are output to inverter gates 228, 232 to generate a disabling signal provided to the timers. Upon start-up, one of the timers will receive a signal 221, 223 before the other and will begin timing while at the same time enabling the respective AND and NOR gates, providing a pulse train to AND gate 240, and disabling the other timer. When the active timer reaches a predetermined time duration, its output switches to a logic low state thereby enabling the opposite timer which provides the alternative pulse train to AND gate 240. The switching process thereby alternates the output of AND gate 240 between frequencies $f_1$ and $f_2$ based upon the predetermined timing periods $t_H$ and $t_L$ of timers 224, 230.

Figure 8:
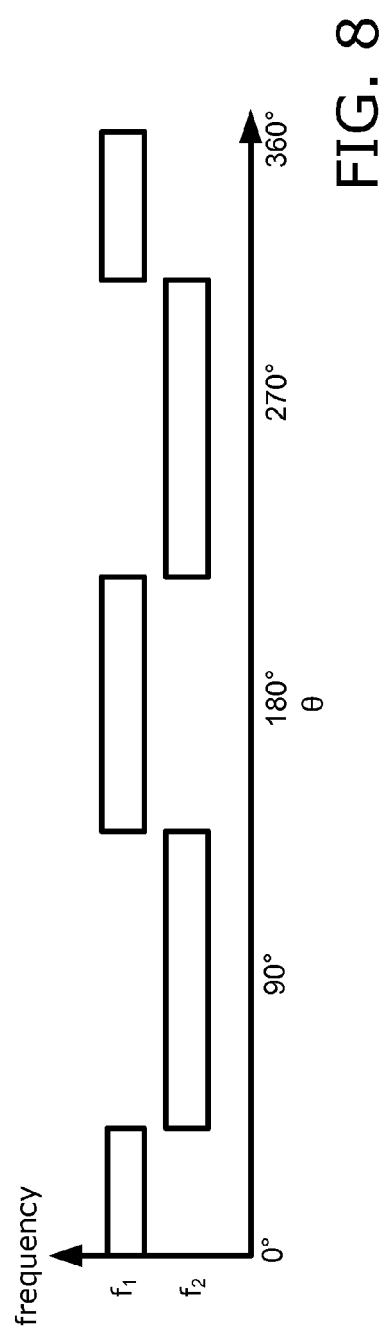
FIGS. 8 to 10 are conceptual graphs showing frequency functions based on commutation angle.

In yet another exemplary embodiment, illustrated in FIG. 8, a frequency switching function is disclosed wherein pulses of frequency $f_1$ and $f_2$ are further modified by addition of a random factor to change the frequencies within narrow bands, which may be referred to as randomizing bands. Advantageously, randomization of the frequencies within narrow bands may reduce or eliminate undesirable vibrations and high pitch audible noise. In one example thereof, the randomizing band comprises a fixed range, e.g., +/− about 1 kilohertz. In another example thereof, the randomizing band comprises a proportion of the frequency, e.g., +/− about 10%. The logic circuit exemplified in FIG. 7 is provided to illustrate one method of generating step function. Alternatively, the functions may be generated using digital counters and may be implemented entirely in software. If implemented in software, values corresponding to the switching functions may be stored in tables in memory or values may be generated dynamically based on predefined formulas. An exemplary formula is provided below.

Figure 9:
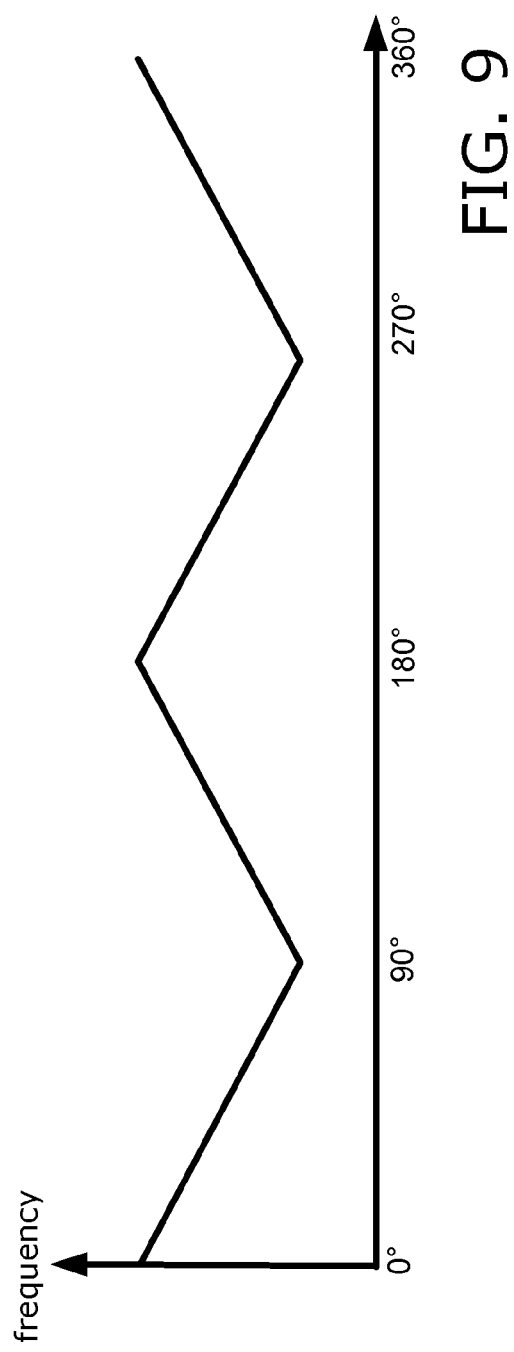
Figure 10:
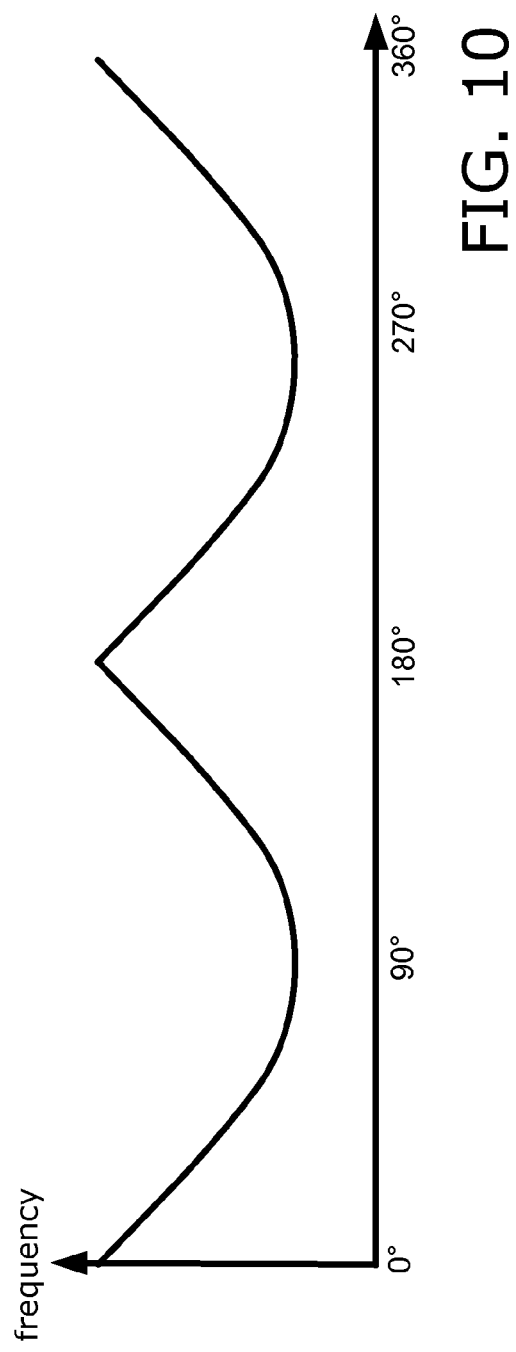

FIGS. 9 and 10 illustrate additional exemplary embodiments of frequency switching functions. FIG. 9 illustrates a switching function which linearly increases from θ=90 to 180 degrees and from θ=270 to 360 degrees, and which linearly decreases from θ=0 to 90 degrees and from θ=180 to 270 degrees. As in the switching function illustrated with reference to FIG. 8, a random banded factor may be applied to reduce noise and vibration. FIG. 10 illustrates a switching function similar to the switching function of FIG. 9 except that the degree of increase and decrease is weighted by the following function:

$$F = f(-ABS|SIN(\theta)|)$$

Advantageously, the function shown above provides a gradual switching frequency change at θ=90, 270. In other embodiments, other switching functions may be provided which apply a slower switching frequency when the fundamental voltage is near its peak and a faster switching frequency when the fundamental voltage is not near its peak. In yet other embodiments, a fast switching frequency is applied at about θ=45, 135, 225, 315, and a slower switching frequency or frequencies are applied at other times.

Figure 11:
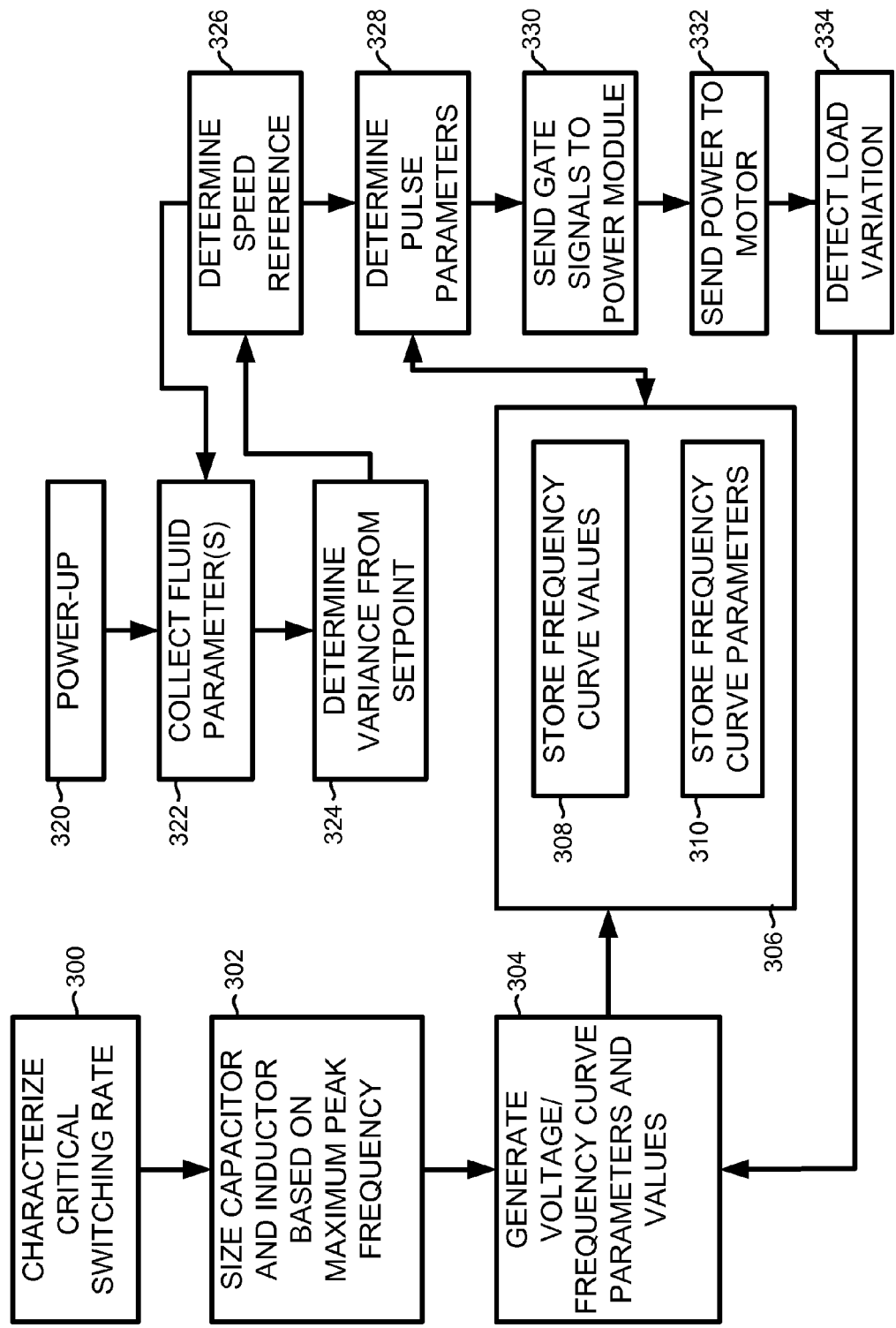
FIG. 11 is a flowchart of a method for driving a pump.

An exemplary embodiment of a variable fluid displacement method is illustrated in FIG. 11. In the displacement method, fluid is displaced by a pump driven by a motor, the motor being driven by a drive portion generating AC power signals. At block 300, the peak switching rate of the drive portion is determined. The peak switching rate is the switching frequency proximal to θ=90. The peak switching rate may be determined in different ways. In one example, the peak switching rate is the rate at which the system malfunctions due to switching frequency and is determined empirically. The peak switching rate may be determined by gradually increasing the switching frequency until a malfunction is detected. In another example, a peak switching rate is determined to limit the switching frequency for any other reason. For example, the peak switching frequency may be estimated at a low value and then gradually increased to overcome observed undesirable conditions such as lower than desired control accuracy or undesirable vibration or audible noise. At block 302, a buck-boost circuit is sized and then coupled to the output of the drive portion. The values of the buck-boost circuit are chosen based on the selected peak switching rate. Larger capacitors may be required at higher peak frequencies. Exemplary capacitors and inductors were described with reference to FIG. 3.

At block 304, a desired voltage/frequency curve is generated based on a switching function having at least two frequencies. In one example, the switching function has a first switching frequency applied proximally to θ=0 and a second, lower, switching frequency applied proximally to θ=90. In another example, the second switching frequency is also lower than the peak switching frequency. In a further example, the voltage/frequency curve parameters are a function of the cut-out threshold. As conditions change, the threshold is shifted to compensate for cut-out voltage and/or current shifts. In a further example, the frequency is increased relative to the fundamental voltage proportionally to increases in the cut-out current.

At block 306, the frequency/voltage parameters corresponding to the drive portion and the selected buck-boost circuit is stored. At block 308, frequency curve values are stored. Alternatively, at block 310 frequency curve parameters corresponding to the selected frequency function are stored from which frequency curve values are automatically determined.

Once the system has been designed, operation begins at block 320 when the system receives fluid characteristic targets, or setpoints, from a user. In one example, setpoints include desired fluid pressures, flow rates, storage reservoir level and the like. Setpoints correspond to control algorithms for the particular system. In another example, setpoints correspond to a target fluid pressure. In a further example, setpoints include a target difference between inlet and outlet flow rates. The system controller then increases inlet flows to match outlet flows and to compensate for their difference over time. Setpoints may include proportional-integral-derivative (PID) parameters to control the pump unit more aggressively in proportion to the gap between actual and target values. At block 322, actual values of fluid parameters are collected and at block 324 the values are compared to setpoints to determine variances from setpoins. At block 326 the variances are used to determine a speed reference signal or value. A PID control loop may be provided to generate the speed reference signal. At block 328 the speed reference signal is applied to generate switching signals which are applied to the power module at 330 to generate power signals. At block 332 the power signals are transmitted to the motor. The motor response is obtained by changing pulse widths and/or frequency in a traditional manner except that the frequencies are generated according to the frequency function.

In another exemplary embodiment, at block 334 motor voltage and current values are monitored to detect load variations. Load variation is detected by comparing the actual load to the expected load. Upon detection of load variations, the control system adapts operating parameters to compensate. In one example thereof, the variation is used to temporarily adjust voltage curve values to recover from an abnormality reflected in the load variation. For example, the voltage may be temporarily raised to augment the charge of the buck-boost capacitor. In another example, the control system compensates by selecting a different point in the volts/hertz curve. In a further example, the control system compensates by selecting a different volts/hertz curve.

Figure 12:
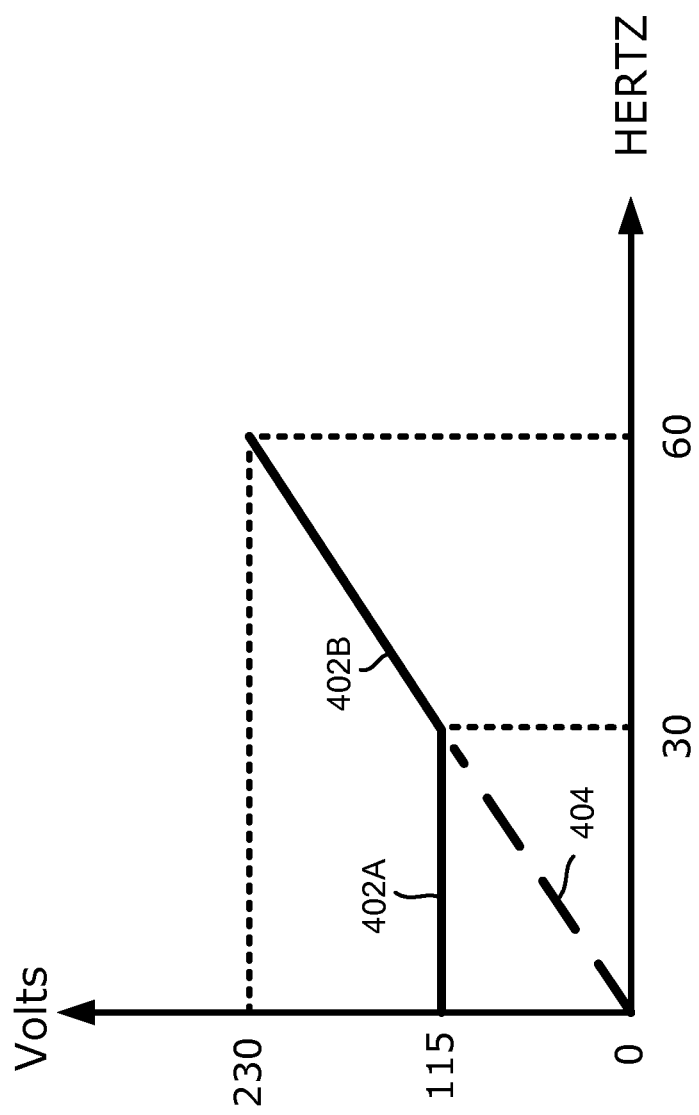
FIG. 12 is a graph showing a voltage versus frequency curve generated with a drive according to the exemplary drive embodiments disclosed herein.

In a further exemplary embodiment of the disclosure, a volts/hertz curve having at least two segments is applied to drive a motor. In a typical volts/hertz curve, the voltage and frequency are increased from 0 to 60 Hertz according to a predetermined relationship to gradually ramp-up the motor speed. In the embodiment described herein, voltage and frequency are applied according to a first volts/hertz relationship until the frequency reaches a frequency threshold, and then voltage and frequency are applied according to a second volts/hertz relationship as the frequency increases above the threshold frequency. The volts/hertz function reflecting the application of two or more volts/hertz relationships may be referred to as a hybrid volts/hertz function. In one example, a uniform voltage is applied during a first segment of a hybrid volts/hertz function, defined between 0 Hertz and a threshold frequency lower than 60 Hertz, regardless of the frequency. Thus, a threshold voltage is provided to the motor during start-up. It should be understood that reference to threshold, uniform or constant voltages refer to the fundamental motor voltage. If the fundamental voltage is generated with a PWM module, the output of the PWM module exhibits a rapid rate of change which produces a fundamental voltage typically between 0 and 60 hertz. In one example, the motor has a cut-out circuit, and the threshold voltage is selected above the cut-out threshold to ensure that the cut-out circuit will function properly. Above the threshold frequency, voltage is related to frequency according to a second relationship. In one example, the second relationship is linear. In another example, the second relationship is linear and constitutes a straight line as illustrated in FIG. 12. The exemplary hybrid function shown in FIG. 12 comprises a first segment 402A reflecting a first volts/hertz relationship and a second segment 402B reflecting a second volts/hertz relationship. In the first volts/hertz relationship, volts are independent of frequency. Once the frequency reaches the threshold frequency, the voltage and frequency are increased along segment 402B. In a further example, the first relationship is not uniform. Rather, voltage increases proportionally with frequency, but the proportion is smaller than in the second relationship. In one variation of the present exemplary embodiment, the hybrid function is applied together with any one of the control features described previously with reference to FIGS. 3 to 11. In another variation thereof, the hybrid function is applied without application of one or more of said control features. In the examples illustrated above, the threshold frequency may be predetermined according to the method described below. The predetermined threshold frequency may be selected from time to time to reflect changes in the operation of the control system or the motor. Exemplary changes include degradation and deterioration caused by use, and replacement of a motor with another. Furthermore, the frequency threshold may be adaptively selected as further described below.

In another further exemplary embodiment of the disclosure, the threshold frequency is adaptively selected. In one example thereof, frequency increases while voltage is controlled according to the first relationship of the hybrid function until a current drop is detected. In one example, the cut-out circuit cuts out at the cut-out threshold which reduces current by the elimination of the current contribution from the secondary winding. The threshold frequency is set to match or exceed the frequency at which the cut-out circuit cuts out. In another example thereof, frequency increases while voltage is controlled according to the first relationship of the hybrid function until a current drop is detected, at which time voltage is controlled according to the second volts/hertz relationship. In a further example thereof, frequency increases while voltage is controlled according to the first relationship of the hybrid function until the threshold frequency is reached, at which time actual current is compared to an expected current reflecting the current expected at the first volts/hertz segment. If the actual current corresponds to the expected current, meaning that the cut-out circuit has not cut out, volts and hertz are increased according to the second relationship until the current drop is detected, at which time the frequency threshold is reset to the new, higher, value.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A fluid displacement system comprising:
   a pump for displacing a fluid;
   a motor drivingly connected to the pump;
   a plurality of power switches; and
   a controller generating a first plurality of switching signals and a second plurality of switching signals to switch the plurality of power switches, the first plurality of switching signals provided to the plurality of power switches when a commutation angle of the motor comprises at least one of a first angle and an angle proximal to the first angle, the second plurality of switching signals provided to the plurality of power switches when the commutation angle comprises at least one of a second angle and an angle proximal to the second angle, the first plurality of switching signals having a first maximum switching frequency which is higher than a second maximum switching frequency of the second plurality of switching signals.

2. A fluid displacement system as in claim 1, at least one of the first plurality of switching signals and the second plurality of switching signals producing a voltage rate of change that exceeds a predetermined voltage rate of change, further including a buck-boost circuit operably coupled to the power switches to reduce the voltage rate of change produced by the power switches below the predetermined voltage rate of change.

3. A fluid displacement system as in claim 2, wherein the second maximum switching frequency is selected to reduce an energy loss in the buck-boost circuit.

4. A fluid displacement system as in claim 2, wherein the motor has a secondary winding and a cut-out circuit configured to de-energize the secondary winding, a maximum cut-out circuit rate of change defining the predetermined voltage rate of change.

5. A fluid displacement system as in claim 1, wherein the second angle is 90 degrees.

6. A fluid displacement system as in claim 5, wherein the first angle comprises 60 degrees.

7. A fluid displacement system as in claim 1, wherein the fluid includes water and is displaced by the pump to maintain a target value of a fluid characteristic of the system.

8. A fluid displacement system as in claim 7, wherein the fluid characteristic includes one of a pressure, a reservoir level, and a fluid-flow differential.

9. A fluid displacement system comprising:
a pump for displacing a fluid;
a motor drivingly connected to the pump, the motor comprising a cut-out circuit including a cut-out power switch having a maximum voltage rate of change;
a plurality of power switches to drive the motor, the power switches producing a voltage rate of change exceeding a predetermined voltage rate of change corresponding to the maximum voltage rate of change of the cut-out power switch; and
a buck-boost circuit coupled between the plurality of power switches and the motor to limit the voltage rate of change produced by the power switches below the predetermined voltage rate of change to prevent false-triggering of the cut-out power switch.

10. A fluid displacement system as in claim 9, further comprising a controller generating a first plurality of switching signals and a second plurality of switching signals to drive the motor, the first plurality of switching signals provided to the plurality of power switches when a commutation angle of the motor comprises at least one of a first angle and an angle proximal to the first angle, the second plurality of switching signals provided to the plurality of power switches when the commutation angle comprises at least one of a second angle and an angle proximal to the second angle, the first plurality of switching signals having a first maximum switching frequency which is higher than a second maximum switching frequency of the second plurality of switching signals.

11. A fluid displacement system as in claim 10, wherein the second maximum switching frequency is selected to reduce an energy loss in the buck-boost circuit.

12. A control system for driving a motor, the motor comprising a cut-out circuit including a cut-out power switch having a maximum voltage rate of change, the control system comprising:
a plurality of power switches producing a voltage rate of change exceeding a predetermined voltage rate of change corresponding to the maximum voltage rate of change of the cut-out power switch; and
a buck-boost circuit coupled between the plurality of power switches and the motor to limit the voltage rate of change produced by the power switches below the predetermined voltage rate of change to prevent false-triggering of the cut-out power switch.

13. A control system according to claim 12, further comprising a controller providing a first plurality of switching signals and a second plurality of switching signals to the plurality of power switches, the first plurality of switching signals provided when a commutation angle of the motor comprises at least one of a first angle and an angle proximal to the first angle, the second plurality of switching signals provided when the commutation angle comprises at least one of a second angle and an angle proximal to the second angle, the first plurality of switching signals having a first maximum switching frequency which is higher than a second maximum switching frequency of the second plurality of switching signals.

14. A control system as in claim 13, wherein the second angle is 90 degrees.

15. A control system as in claim 14, wherein the first angle comprises 60 degrees.

16. A control system as in claim 13, wherein the second maximum switching frequency is selected to reduce an energy loss in the buck-boost circuit.

17. A control system as in claim 12, wherein the buck-boost circuit comprises a capacitor connected in parallel with the motor and an inductor connected in series with the capacitor.

18. A control system as in claim 12, wherein the motor has a secondary winding, and the cut-out circuit is configured to de-energize the secondary winding of the motor after a predetermined time period.

19. A control system according to claim 18, further comprising a controller providing to the plurality of power switches a first plurality of switching signals and a second plurality of switching signals, the first plurality of switching signals provided when a commutation angle of the motor comprises at least one of a first angle and an angle proximal to the first angle, the second plurality of switching signals provided when the commutation angle comprises at least one of a second angle and an angle proximal to the second angle, the first plurality of switching signals having a first maximum switching frequency which is higher than a second maximum switching frequency of the second plurality of switching signals, wherein the cut-out circuit defines a cut-out threshold at which the secondary winding cuts out, the first and second plurality of switching signals defined by a voltage/frequency curve selected as a function of the cut-out threshold, wherein the controller adjusts the frequency/voltage ratio to compensate for shifts in the cut-out threshold.

20. A control system as in claim 19, wherein the frequency/voltage adjustment comprises an increase when the threshold shift comprises a decrease.

21. A control system as in claim 12, wherein the plurality of power switches produce a fundamental voltage according to a first fundamental voltage/frequency relationship, further comprising a controller detecting a current decrease of a fundamental current drawn by the motor, and after detecting the current decrease, causing the plurality of power switches to generate a second plurality of switching signals according to a second fundamental voltage/frequency relationship.

22. A control system as in claim 21, wherein in the first fundamental voltage/frequency relationship, a fundamental voltage is independent of frequency.

23. A control system for driving a motor, the control system comprising:
a plurality of power switches producing a motor voltage having a voltage rate of change; and
a controller generating a first plurality of switching signals and a second plurality of switching signals to drive the motor, the first plurality of switching signals generated when a commutation angle of the motor comprises at least one of a first angle and an angle proximal to the first angle, the second plurality of switching signals generated when the commutation angle comprises at least one of a second angle and an angle proximal to the second angle, the first plurality of switching signals having a first maximum switching frequency which is higher than a second maximum switching frequency of the second plurality of switching signals.

24. A control system as in claim 23, wherein the controller includes the plurality of power switches.

25. A control system as in claim 23, wherein the second angle is 90 degrees.

26. A control system as in claim 23, wherein the first angle comprises 60 degrees.

27. A control system as in claim 23, wherein the second plurality of switching signals are within an offset from the first angle.

28. A control system as in claim 23, wherein the second maximum switching frequency is less than about 20 kilohertz.

29. A control system as in claim 23, wherein the plurality of power switches are switched at a variable frequency such that the power switches are switched slower when a commutation angle of the motor is near the second angle than when the commutation angle is near the first angle.

30. A control system as in claim 23, wherein the first plurality of switching signals switch the power switches at a first frequency and the second plurality of switching signals switch the power switches at a second frequency.

31. A control system as in claim 30, wherein the first frequency is higher than the second frequency.

32. A control system as in claim 31, wherein the controller alternates switching of the power switches from the first frequency to the second frequency as a difference between the commutation angle and the second angle decreases and from the second frequency to the first frequency as the difference increases.

33. A control system as in claim 23, wherein at least one of the first plurality of switching signals and the second plurality of switching signals is randomized within a randomizing band.

34. A control system as in claim 23, further including a buck-boost circuit to limit the voltage rate of change produced by the power switches below a predetermined voltage rate of change of the motor.

35. A control system as in claim 23, wherein the motor has a secondary winding and a cut-out circuit configured to de-energize the secondary winding of the motor after a predetermined time period, a maximum cut-out circuit rate of change defining the predetermined rate of change.

36. A control system as in claim 35, wherein the cut-out circuit defines a cut-out threshold at which the secondary winding cuts out, the first and second plurality of switching signals defined by a voltage/frequency curve selected as a function of the cut-out threshold, wherein the controller adjusts the frequency/voltage ratio to compensate for shifts in the cut-out threshold.

37. A control system as in claim 36, wherein the frequency/voltage adjustment comprises an increase when the threshold shift comprises a decrease.

38. A control system as in claim 35, wherein the buck-boost circuit is operably coupled to the power switches.

39. A control system as in claim 35, wherein the second maximum switching frequency is selected to reduce an energy loss in the buck-boost circuit.

40. A control system as in claim 23, wherein the plurality of power switches initially produce the voltage according to a first fundamental voltage/frequency relationship, wherein the controller detects a current decrease of a fundamental current drawn by the motor, and after detecting the current decrease, causes the plurality of power switches to generate the voltage according to a second fundamental voltage/frequency relationship.

41. A control system as in claim 40, wherein in the first fundamental voltage/frequency relationship, a fundamental voltage is independent of frequency.

42. A control system for driving a motor, the motor comprising a cut-out circuit including a cut-out power switch having a maximum voltage rate of change, the control system comprising:
voltage generation means for providing a voltage having a voltage rate of change corresponding to the maximum voltage rate of change of the cut-out power switch; and
circuit means coupled between the voltage generation means and the motor for reducing the voltage rate of change produced by the voltage generation means to prevent false-triggering of the cut-out power switch.

43. A control system according to claim 42, further comprising control means for generating a first plurality of switching signals and a second plurality of switching signals, the first plurality of switching signals provided when a commutation angle of the motor comprises at least one of a first angle and an angle proximal to the first angle, the second plurality of switching signals provided when the commutation angle comprises at least one of a second angle and an angle proximal to the second angle, the first plurality of switching signals having a first maximum switching frequency which is higher than a second maximum switching frequency of the second plurality of switching signals.

44. A control system for driving a motor, the control system comprising:
voltage generation means for providing a voltage having a voltage rate of change; and
control means for generating a first plurality of switching signals and a second plurality of switching signals, the first plurality of switching signals provided when a commutation angle of the motor comprises at least one of a first angle and an angle proximal to the first angle, the second plurality of switching signals provided when the commutation angle comprises at least one of a second angle and an angle proximal to the second angle, the first plurality of switching signals having a first maximum switching frequency which is higher than a second maximum switching frequency of the second plurality of switching signals.

45. A control system according to claim 44, further comprising circuit means coupled between the voltage generation means and the motor for reducing the voltage rate of change produced by the voltage generation means below a predetermined rate of change.

46. A method of driving a motor, the motor comprising a cut-out circuit including a cut-out power switch having a maximum voltage rate of change, the method comprising:
switching a plurality of power switches to generate an output voltage having a rate of change exceeding a predetermined rate of change, the predetermined rate of change corresponding to the maximum voltage rate of change of the cut-out power switch; and
reducing the rate of change of the output voltage to produce motor voltage with a motor voltage rate of change below the predetermined rate of change to prevent false-triggering of the cut-out power switch.

47. A method as in claim 46, further comprising providing to the power switches a first plurality of switching signals and a second plurality of switching signals, the first plurality of switching signals generated when a commutation angle of the motor comprises at least one of a first angle and an angle proximal to the first angle, the second plurality of switching signals generated when the commutation angle comprises at least one of a second angle and an angle proximal to the second angle, the first plurality of switching signals having a first maximum switching frequency which is higher than a second maximum switching frequency of the second plurality of switching signals.

48. A method as in claim 46, wherein the motor has a cut-out circuit configured to de-energize a secondary winding of the motor after a predetermined time period, the predetermined rate of change being defined by a cut-out circuit maximum rate of change.

49. A method as in claim 46, further comprising driving a pump with the motor to control a target value of a fluid characteristic.

50. A method as in claim 49, wherein the fluid characteristic includes one of a pressure, a reservoir level, and a fluid-flow differential.

51. A method as in claim 46, further comprising initially generating the output voltage according a first fundamental voltage/frequency relationship, detecting a current decrease of a fundamental current drawn by the motor, and after detecting the current decrease, generating the output voltage according to a second fundamental voltage/frequency relationship.

52. A method as in claim 51, wherein in the first fundamental voltage/frequency relationship, a fundamental voltage is independent of frequency.

53. A method of driving a motor, the method comprising:
generating a first plurality of switching signals and a second plurality of switching signals, the first plurality of switching signals generated when a commutation angle of the motor comprises at least one of a first angle and an angle proximal to the first angle, the second plurality of switching signals generated when the commutation angle comprises at least one of a second angle and an angle proximal to the second angle, the first plurality of switching signals having a first maximum switching frequency which is higher than a second maximum switching frequency of the second plurality of switching signals; and
switching a plurality of power switches with the first plurality of switching signals and the second plurality of switching signals to generate an output voltage.

54. A method as in claim 53, further comprising reducing a rate of change of the output voltage to produce a motor voltage with a voltage rate of change below a predetermined rate of change.

55. A method as in claim 54, wherein the motor has a secondary winding and a cut-out circuit configured to de-energize the secondary winding of the motor after a predetermined time period, the predetermined rate of change defined by a cut-out circuit maximum rate of change.

56. A method as in claim 54, further comprising driving the motor over a range of frequencies and detecting a motor failure corresponding to a frequency from the range of frequencies, wherein the predetermined rate of change is defined based on the frequency corresponding to the motor failure.

57. A method as in claim 53, further comprising generating the output voltage according a first fundamental voltage/frequency relationship, detecting a current decrease of a fundamental current drawn by the motor, and after detecting the current decrease, generating the output voltage according to a second fundamental voltage/frequency relationship.

58. A method as in claim 57, wherein in the first fundamental voltage/frequency relationship, a fundamental voltage is independent of frequency.

59. A method of driving a motor, the method comprising:
powering the motor according a first fundamental voltage/frequency relationship;
detecting a current decrease of a fundamental current drawn by the motor; and
upon detecting the current decrease, defining a frequency threshold based on a frequency at which the current decrease occurred; and
after detecting the current decrease, powering the motor according to a second fundamental voltage/frequency relationship.

60. A method as in claim 59, wherein in the first fundamental voltage/frequency relationship, a fundamental voltage is independent of frequency.

61. A method as in claim 59, wherein after the frequency threshold is defined, the motor is powered according to the second fundamental voltage/frequency relationship after the frequency reaches the threshold frequency.

62. A control system for driving a motor, the control system comprising:
a plurality of power switches producing a fundamental voltage; and
a controller operably coupled to the plurality of power switches, the controller generating a first plurality of switching signals according to a first fundamental voltage/frequency relationship, detecting a current decrease of a fundamental current drawn by the motor, and after detecting the current decrease, generating a second plurality of switching signals according to a second fundamental voltage/frequency relationship.

63. A control system as in claim 62, wherein in the first fundamental voltage/frequency relationship, a fundamental voltage is constant.

64. A control system as in claim 62, wherein upon detecting the current decrease, the controller defines a frequency threshold based on a frequency at which the current decrease occurred.

65. A control system as in claim 64, wherein after the frequency threshold is defined, the motor is powered according to the second fundamental voltage/frequency relationship after the frequency reaches the threshold frequency.

\* \* \* \* \*